United States Patent
Loehr et al.

(10) Patent No.: US 12,302,386 B2
(45) Date of Patent: May 13, 2025

(54) UPLINK LBT FAILURE FOR THE ACTIVE BWP

(71) Applicant: Lenovo (Singapore) PTE. LTD., New Tech Park (SG)

(72) Inventors: Joachim Loehr, Wiesbaden (DE); Alexander Johann Maria Golitschek Edler Von Elbwart, Darmstadt (DE); Prateek Basu Mallick, Dreieich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 491 days.

(21) Appl. No.: 17/764,489

(22) PCT Filed: Oct. 31, 2020

(86) PCT No.: PCT/IB2020/060248
§ 371 (c)(1),
(2) Date: Mar. 28, 2022

(87) PCT Pub. No.: WO2021/084516
PCT Pub. Date: May 6, 2021

(65) Prior Publication Data
US 2022/0369370 A1    Nov. 17, 2022

Related U.S. Application Data

(60) Provisional application No. 62/929,030, filed on Oct. 31, 2019.

(51) Int. Cl.
*H04W 74/0808*    (2024.01)
*H04W 74/0833*    (2024.01)

(52) U.S. Cl.
CPC ... *H04W 74/0808* (2013.01); *H04W 74/0833* (2013.01)

(58) Field of Classification Search
CPC ............ H04W 74/0808; H04W 74/0833
See application file for complete search history.

(56) References Cited

U.S. PATENT DOCUMENTS 9,674,874 B2    6/2017    Wang et al.
2020/0053777 A1*    2/2020    Babaei .................. H04W 16/14
(Continued)

OTHER PUBLICATIONS

PCT/IB2020/060248, "Notification of Transmittal of The International search Report and The Written Opinion of The International Searching Authority, or The Declaration", International Searching Authority—PCT, Jan. 12, 2021, pp. 1-12.
(Continued)

*Primary Examiner* — Jael M Ulysse
(74) *Attorney, Agent, or Firm* — Kunzler Bean & Adamson

(57) ABSTRACT

Apparatuses, methods, and systems are disclosed for handling consistent UL LBT failure. One apparatus (500) includes a transceiver (525) that communicates with a serving cell in a wireless communication network. The apparatus (500) includes a processor (505) that detects (705) an uplink LBT failure in an active BWP of the serving cell and determines (710) a state of consistent uplink LBT failure for the active BWP in response to detecting a predetermined number of uplink LBT failures. The processor (505) sets (715) an unexpired timing alignment timer as expired in response to determining the state of consistent uplink LBT failure for the active BWP and initiates (720) a random-access procedure for the serving cell.

20 Claims, 7 Drawing Sheets

(56) References Cited

U.S. PATENT DOCUMENTS

| | | | |
|---|---|---|---|
| 2020/0053778 A1* | 2/2020 | Babaei | H04W 72/23 |
| 2020/0053779 A1* | 2/2020 | Jeon | H04W 74/02 |
| 2020/0053799 A1* | 2/2020 | Jeon | H04L 5/0048 |
| 2020/0092861 A1* | 3/2020 | Xu | H04W 72/23 |
| 2020/0092913 A1* | 3/2020 | Xu | H04W 74/0816 |
| 2020/0100170 A1* | 3/2020 | Babaei | H04L 5/0053 |
| 2020/0100286 A1* | 3/2020 | Xu | H04L 1/187 |
| 2020/0106573 A1* | 4/2020 | Cirik | H04W 74/0808 |
| 2020/0107277 A1* | 4/2020 | Jeon | H04W 52/36 |
| 2020/0107369 A1* | 4/2020 | Jeon | H04W 74/006 |
| 2020/0146058 A1* | 5/2020 | Xu | H04W 72/0453 |
| 2020/0146062 A1* | 5/2020 | Xu | H04W 72/23 |
| 2020/0146063 A1* | 5/2020 | Xu | H04W 24/08 |
| 2020/0154480 A1* | 5/2020 | Jose | H04W 74/0825 |
| 2020/0220693 A1* | 7/2020 | Babaei | H04L 1/1812 |
| 2020/0221310 A1* | 7/2020 | Babaei | H04L 1/1671 |
| 2020/0229227 A1* | 7/2020 | Babaei | H04W 76/11 |
| 2020/0229241 A1* | 7/2020 | Jeon | H04W 74/0833 |
| 2020/0260486 A1* | 8/2020 | Zhou | H04L 1/1835 |
| 2020/0275484 A1* | 8/2020 | Xu | H04W 74/0808 |
| 2020/0275485 A1* | 8/2020 | Babaei | H04W 74/006 |
| 2020/0314903 A1* | 10/2020 | Jang | H04W 72/21 |
| 2020/0351801 A1* | 11/2020 | Jeon | H04W 52/48 |
| 2020/0412437 A1* | 12/2020 | Cirik | H04W 76/19 |
| 2021/0007147 A1* | 1/2021 | Yang | H04W 56/001 |
| 2021/0029768 A1* | 1/2021 | Shih | H04W 74/0833 |
| 2021/0100031 A1* | 4/2021 | Cirik | H04W 76/19 |
| 2021/0105096 A1* | 4/2021 | Chin | H04L 1/1812 |
| 2021/0105812 A1* | 4/2021 | Rastegardoost | H04W 74/0808 |
| 2021/0153245 A1* | 5/2021 | Tooher | H04W 72/0453 |
| 2021/0168862 A1* | 6/2021 | Murray | H04W 74/0836 |
| 2021/0194756 A1* | 6/2021 | Babaei | H04B 7/088 |
| 2021/0345405 A1* | 11/2021 | Kim | H04W 74/0808 |
| 2021/0410186 A1* | 12/2021 | Hajir | H04W 74/0816 |
| 2022/0014337 A1* | 1/2022 | Ouchi | H04W 74/0808 |
| 2022/0022252 A1* | 1/2022 | Lee | H04W 24/08 |
| 2022/0039016 A1* | 2/2022 | Terry | H04W 52/0235 |
| 2022/0039158 A1* | 2/2022 | Awadin | H04W 74/0816 |
| 2022/0070930 A1* | 3/2022 | Xiong | H04W 72/0453 |
| 2022/0078873 A1* | 3/2022 | Belleschi | H04W 28/24 |
| 2022/0104280 A1* | 3/2022 | Yang | H04W 74/0841 |
| 2022/0110153 A1* | 4/2022 | Wu | H04W 74/0808 |
| 2022/0150973 A1* | 5/2022 | Lim | H04W 72/23 |
| 2022/0167408 A1* | 5/2022 | Lee | H04W 74/0808 |
| 2022/0174739 A1* | 6/2022 | Kwak | H04W 74/0816 |
| 2022/0346174 A1* | 10/2022 | Wang | H04W 74/0808 |
| 2024/0204932 A1* | 6/2024 | Cirik | H04W 74/0808 |

OTHER PUBLICATIONS

3GPP, "Handling UL LBT failures", Ericsson 3GPP TSG RAN WG2 #105, R2-1901674, Feb.-Mar. 1, 2019, pp. 1-3.

3GPP, "3rd Generation Partnership Project; Technical Specification Group Radio Access Network; NR; Medium Access Control (MAC) protocol specification (Release 15)", 3GPP TS 38.321 V15.7.0, Sep. 2019, pp. 1-78.

Nokia, Nokia Shanghai Bell, "Multiple configured grants per BWP for NR-U", 3GPP TSG-RAN WG2 Meeting #107bis R2-1913289, Oct. 14-18, 2019, pp. 1-2.

3GPP, "On consistent LBT failures", Mediatek Inc. 3GPP TSG-RAN WG2 Meeting #107bis R2-1913260, Oct. 14-18, 2019, pp. 1-5.

* cited by examiner

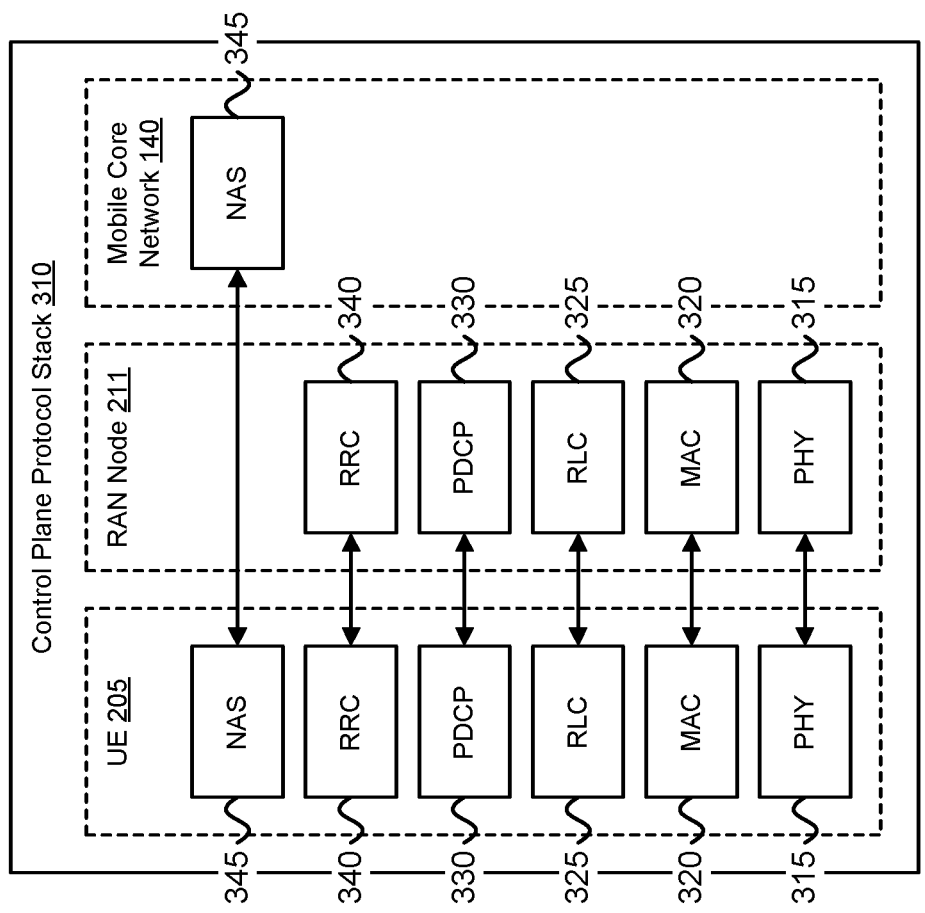
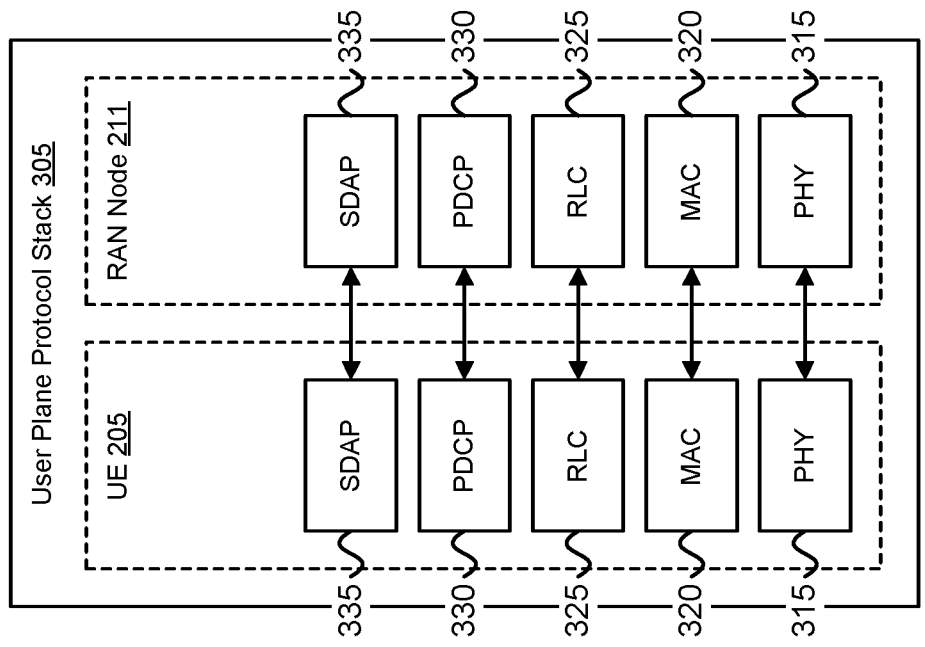
FIG. 3

ConfiguredGrant-Config Information Element 400

```
-- ASN1START

CG-Config-r16 ::=   CHOICE {
release             NULL,
setup               SEQUENCE {
    CG-index                        Integer (0..15),
    CG-Subframes-r16                BIT STRING (SIZE (40)),
    CG-HARQ-Processes-r16           BIT STRING (SIZE (16)),
    ConfiguredGrantTimer-r16        ENUMERATED {psf16, psf20, psf28, psf44, psf68,
                                    psf84, psf100, psf132, psf164, psf324, psf648,
                                    psf1000, psf1024},
    CG-RetransmissionTimer-r16      ENUMERATED {psf4, psf5, psf6, psf8, psf10, psf12,
                                    psf20, psf28, psf37, psf44, psf68, psf84, psf100,
                                    psf116, psf132, psf164, psf324},
    endingSymbolCG-r16              INTEGER(12..13),
    subframeOffsetCOT-Sharing-r16   INTEGER(2..4),
    contentionWindowSizeTimer-r16   ENUMERATED {n0, n5, n10}
}
}

-- ASN1STOP
```

FIG. 4

UPLINK LBT FAILURE FOR THE ACTIVE BWP

CROSS-REFERENCE TO RELATED APPLICATIONS

This application claims priority to U.S. Provisional Patent Application No. 62/929,030 entitled "UL AUTONOMOUS BWP SWITCHING DUE TO CONSISTENT LBT FAILURE" and filed on Oct. 31, 2019 for Joachim Loehr, Alexander Johann Maria Golitschek Edler von Elbwart, and Prateek Basu Mallick, which application is incorporated herein by reference.

FIELD

The subject matter disclosed herein relates generally to wireless communications and more particularly relates to handling consistent Listen-Before-Talk ("LBT") failure for one or more uplink ("UL") autonomous bandwidth parts ("BWPs").

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Positive-Acknowledgment ("ACK"), Application Programming Interface ("API"), Access Stratum ("AS"), Autonomous Uplink ("AUL"), AUL Downlink Feedback Information ("AUL-DFP"), Base Station ("BS"), Bandwidth Part ("BWP"), Clear Channel Assessment ("CCA"), Code Division Multiple Access ("CDMA"), Control Element ("CE"), Cyclic Prefix ("CP"), Channel State Information ("CSI"), Configured Grant ("CG"), Core Network ("CN"), Control Plane ("CP"), Data Radio Bearer ("DRB"), Downlink Feedback Information ("DFI"), Discrete Fourier Transform Spread ("DFTS"), Downlink Control Information ("DCI"), Downlink ("DL"), Discontinuous Transmission ("DTX"), Enhanced Clear Channel Assessment ("eCCA"), Enhanced Mobile Broadband ("eMBB"), Evolved Node-B ("eNB"), Evolved Packet Core ("EPC"), Evolved Packet System ("EPS"), Evolved UMTS Terrestrial Radio Access ("E-UTRA"), Evolved UMTS Terrestrial Radio Access Network ("E-UTRAN"), European Telecommunications Standards Institute ("ETSI"), General Packet Radio Service ("GPRS"), Global System for Mobile Communications ("GSM"), Hybrid Automatic Repeat Request ("HARQ"), Home Subscriber Server ("HSS"), Home Public Land Mobile Network ("HPLMN"), Information Element ("IE"), Internet-of-Things ("IoT"), Listen-Before-Talk ("LBT"), Long Term Evolution ("LTE"), Multiple Access ("MA"), Mobility Management ("MM"), Mobility Management Entity ("MME"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), NR using unlicensed spectrum ("NR-U"), Non-Access Stratum ("NAS"), Network Exposure Function ("NEF"), Network Slice Selection Assistance Information ("NSSAI"), Packet Data Unit ("PDU", used in connection with 'PDU Session'), Packet Switched ("PS", e.g., Packet Switched domain or Packet Switched service), Primary Cell ("PCell"), Physical Downlink Control Channel ("PDCCH"), Packet Data Network ("PDN"), Physical Downlink Shared Channel ("PDSCH"), PDN Gateway ("P-GW"), Physical Hybrid Automatic Repeat Request Indicator Channel ("PHICH"), Physical Random-access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Radio Access Network ("RAN"), Radio Resource Control ("RRC"), Random-Access Channel ("RACH"), Random-access Response ("RAR"), Reference Signal ("RS"), Registration Area ("RA", similar to tacking area list used in LTE/EPC), Receive ("RX"), Radio Link Control ("RLC"), Single Carrier Secondary Cell ("SCell"), Shared Channel ("SCH"), Serving Gateway ("S-GW"), Session Management ("SM"), Session Management Function ("SMF"), Service Provider ("SP"), Single Network Slice Selection Assistance Information ("S-NSSAI"), Sounding Reference Signal ("SRS"), Timing Alignment Timer ("TAT"), Tracking Area ("TA"), Transport Block ("TB"), Transport Block Size ("TBS"), Transmission Time Interval ("TTI"), Transmit ("TX"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, service is supplemented by operation on unlicensed spectrum. However, operation on unlicensed spectrum requires Clear Channel Assessment ("CCA") prior to transmission, for example involving a Listen-Before-Talk ("LBT") procedure. Currently, procedures for handling consistent LBT failure are lacking, especially for the case of bandwidth ("BWP") operation in 5G access networks.

BRIEF SUMMARY

Disclosed are procedures for handling consistent UL LBT failure. Said procedures may be implemented by apparatus, systems, methods, or computer program products.

One method of a UE includes detecting an uplink LBT failure in an active BWP of a serving cell and determining a state of consistent uplink LBT failure for the active BWP in response to detecting a predetermined number of uplink LBT failures. The method includes setting an unexpired timing alignment timer as expired in response to determining the state of consistent uplink LBT failure for the active BWP and initiating a random-access procedure for the serving cell.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a diagram illustrating one embodiment of a NR protocol stack;

FIG. 4 is a diagram illustrating one embodiment of a configured-grant configuration information element;

DETAILED DESCRIPTION

Figure 1:
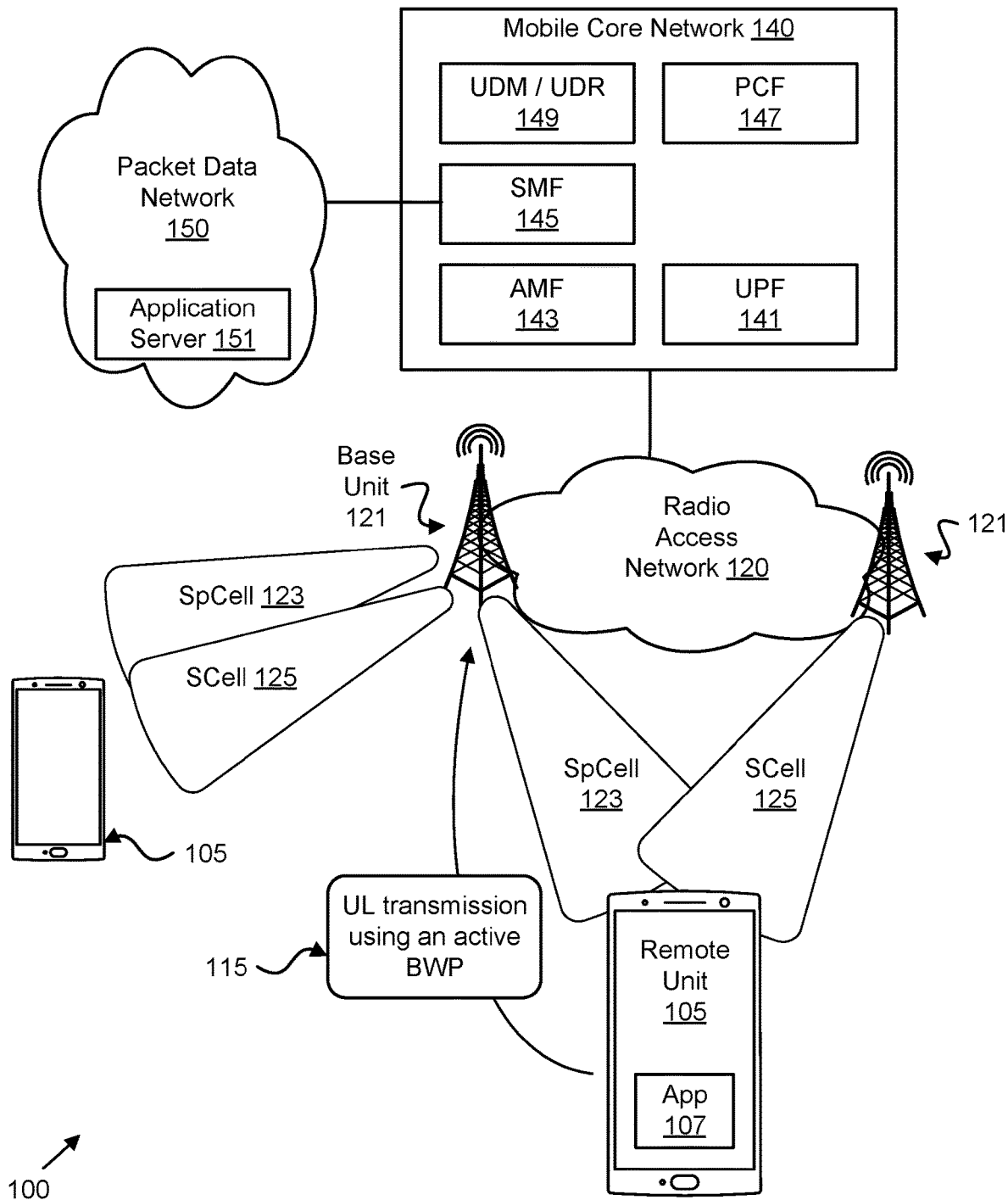
FIG. 1 is a schematic block diagram illustrating one embodiment of a wireless communication system for handling consistent UL LBT failure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for handling consistent UL LBT failure. At a UE, the MAC layer may rely on reception of a notification of UL LBT failure from the physical layer to detect a consistent UL LBT failure. The UE may switch to another BWP and initiate RACH upon declaration of consistent LBT failure on PCell or PSCell if there is another BWP with configured RACH resources. Moreover, the UE may perform radio link failure ("RLF") recovery if the consistent UL LBT failure was detected on the PCell and UL LBT failure was detected on N possible BWPs. Here, N is the number of configured BWPs with configured PRACH resources.

When consistent uplink LBT failures are detected on the PSCell, the UE informs a master node ("MN") via the secondary cell group ("SCG") failure information procedure after detecting a consistent UL LBT failure on N BWPs. If N is larger than one, then it is up to the UE implementation which BWP the UE selects. In one embodiment, when consistent uplink LBT failures are detected on an SCell, a new MAC CE to report this to the node where SCell belongs to is used. In certain embodiments, this MAC CE may also be used to report failure on PCell.

In some embodiments, the UE may be permitted to autonomously switch the UL BWP in case of consistent LBT failure UE. Under currently defined behavior, the UE is to (re-)initialize any suspended configured uplink grants of configured grant Type 1 on the active BWP according to the stored configuration. One motivation for permitting autonomous UL BWP switching is that other UL BWP(s) of the NR-U cell may not be subject to large number of LBT failures, e.g., due to different LBT sub-bands being used for different UL BWP(s).

However, one problem with autonomous switching behavior is that upon activation of an UL BWP UE will (re-)initialize any suspended configured uplink grants of configured grant Type 1 on the active BWP according to the stored configuration, if any, and to start in an identified symbol. In one embodiment, the symbol may be identified according to rules in subclause 5.8.2 of 3GPP TS 38.321. Accordingly, for each activated serving cell configured with a BWP, the MAC entity of the UE, if the BWP is activated, will perform one or more of the following: A) transmit on UL-SCH on the BWP; B) transmit on RACH on the BWP, if PRACH occasions are configured; C) monitor the PDCCH on the BWP; D) transmit PUCCH on the BWP, if configured; E) report CSI for the BWP; F) transmit SRS on the BWP, if configured; G) receive DL-SCH on the BWP; and H) (re-)initialize any suspended configured uplink grants of configured grant Type 1 on the active BWP according to the stored configuration, if any, and to start in the symbol identified as discussed above.

Therefore, the UE may perform some unexpected configured grant ("CG") transmissions which may interfere with other user's uplink transmissions, since the gNB is not aware of the UE autonomous BWP switching (until the random-access procedure has been successfully completed) and hence not aware of the CG transmission(s). As used herein, a "configured grant" refers to a semi-persistent allocation of network resources. In some embodiments, Autonomous UL ("AUL") transmission—where the UE is pre-allocated reoccurring uplink resources—may be realized using configured grants.

In some embodiments, the UE may only be permitted to autonomously switch to the initial UL BWP, where typically no CG resources are configured, for cases when UE has to perform RACH but the current active UL BWP has no configured PRACH resources. For example, a RAN node may schedule a recurring grant, i.e., using a single grant to signal multiple, non-consecutive resource allocations. In various embodiments, the CG resources occur periodically. In some embodiments, the CG resources may be shared among multiple UEs. By using configured grants, the RAN enables a user (i.e., UE) with regular (i.e., periodic) traffic to transmit its data readily and bypasses the signaling entailed to scheduling requests and scheduling grants, thus providing the UE low-latency access to the network.

In various implementation, an NR-U system is to support multiple CGs per UL BWP. Note that in NR Rel-15, only one CG can be configured per BWP. Thus, NR Rel-15 behavior must be modified to support multiple CGs per UL BWP. For NR-U, one motivation to introduce multiple CG per BWP is to increase transmission opportunities, e.g., to allow resources on different sub-bands to be activated at the same time. For NR-U, the selection of a HARQ process ID—from a set of HARQ processes configured for CG/AUL transmissions—for a configured grant transmission is left to UE implementation. Here, the UE may indicate the selected HARQ process ID/RV within the UCI signaled along the UL-SCH.

ConfiguredGrantTimer and ConfiguredGrant-RetransmissionTimer are maintained per HARQ process to determine whether a HARQ process is available for new transmission/retransmission. When the ConfiguredGrant-RetransmissionTimer is running, the UE will wait for potential HARQ feedback (i.e., DFI) or an UL grant. While the ConfiguredGrantTimer is running, the UE is expecting a dynamic UL grant and thus cannot use the HARQ process for new transmissions. As the LBT success rate may change dynamically depending on the channel availability status, configuring the number of HARQ processes to be used separately for each CG in a semi-static manner might cause either HARQ processes pool shortage or underutilization.

In certain embodiments, all configured grants of a BWP share a common pool of HARQ processes as opposed to a HARQ process configuration per Configured grant, i.e., each CG is to be configured with separate HARQ processes. However, described herein is an alternative method/solution and related signaling which allows the gNB to control which of the configured CG(s) share a common pool of HARQ processes and which CG(s) are configured with separate independent HARQ processes.

In some embodiments, a UE autonomously switches UL BWP (i.e., switches the active UL BWP without receiving instruction from the RAN node) in response to detection a consistent UL LBT failure for a UL BWP. Moreover, the UE avoids configured grant ("CG") transmissions after autonomous UL BWP switching.

In certain embodiments, the UE (e.g., MAC entity of the UE) considers the timeAlignmentTimer associated with the cell as expired upon detecting a consistent UL LBT failure in the current active UL BWP on that serving cell. Moreover, the MAC entity may stop any UL transmissions on the serving cell, except for Random-Access preamble transmission (e.g., Msg1 of a RACH procedure) after autonomous UL BWP switching.

In certain embodiments, the UE does not clear any configured downlink assignments and configured uplink grants for a serving cell upon considering the associated timeAlignmentTimer as expired in response to detecting consistent UL LBT failure for the UL BWP on that serving cell. Furthermore, the UE may not consider all running timeAlignmentTimers as expired, i.e. UE may only the timeAlignmentTimer associated with the serving cell for which consistent LBT failure was detected as expired (other serving cells/timeAlignmentTimers are not impacted).

In certain embodiments, the UE suspends any uplink transmissions, e.g. configured grant uplink transmission(s), except the PRACH transmission until the random-access procedure was successfully completed on the (new) UL BWP the UE autonomously switched to in response to having detected a consistent UL LBT failure. In certain embodiments, the UE upon autonomously switching to another UL BWP configured for a NR-U cell for which consistent LBT failure was detected, does not (re-)initialize any suspended configured uplink grants of configured grant Type 1 on the active BWP according to the stored configuration.

In various embodiments, the gNB configures the UE with Configured grant configuration(s) comprising of at least the HARQ process ID(s) the UE is to use for uplink transmissions on the corresponding configured uplink resources. In certain embodiments, the set of HARQ process ID(s) configured for the corresponding configured grant allocations is signaled by a bitmap. For cases when two or more ConfiguredGrant configurations have the same HARQ process ID configuration, i.e., bitmap indicates that the same HARQ process(es) are configured for the two or more CG(s) of a UL BWP, those CG(s) share a common pool of HARQ processes. In one embodiment, the UE may transmit retransmissions on different CG resources as compared to initial transmission when CGs share a common pool of HARQ processes.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the wireless communication links. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the UPF 141. In order to establish the PDU session, the remote unit 105 must be registered with the mobile core network. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 121 may be distributed over a geographic region. In certain embodiments, a base unit 121 may also be referred to as an access terminal, an access point, a base, a base station, a Node-B, an eNB, a gNB, a Home Node-B, a relay node, a RAN node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link. As depicted, a base unit 121 may support a special cell 123 (i.e., a PCell or PSCell) and/or a SCell 125. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links. The wireless communication links may be any suitable carrier in licensed or unlicensed radio spectrum. The wireless communication links facilitate communication between one or more of the remote units 105 and/or one or more of the base units 121.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management/User Data Repository function ("UDM/UDR") 149. In various embodiments, the mobile core network 140 may also include an Authentication Server Function ("AUSF"), a Network Repository Function ("NRF") (used by the various NFs to discover and communicate with each other over APIs), a Network Exposure Function ("NEF"), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, a remote unit 105 may experience consistent LBT Failure for a current active BWP. For example, when operating on unlicensed frequencies, the remote unit 105 may perform a LBT procedure for a current active BWP prior to performing UL transmission 115 using the active BWP. In some embodiments, the remote unit 105 autonomously switches UL BWP (i.e., switches the active UL BWP without receiving instruction from the base unit 121) in response to detection a consistent UL LBT failure. Moreover, the remote unit 105 avoids configured grant ("CG") transmissions after autonomous UL BWP switching.

In certain embodiments, the remote unit 105 (e.g., MAC entity of the remote unit 105) considers the timeAlignmentTimer associated with the cell as expired upon detecting a consistent UL LBT failure for a UL BWP on that serving cell. Moreover, the MAC entity may stop any UL transmissions 115 on the serving cell, except for Random-Access preamble transmission (e.g., Msg1 of a RACH procedure) after autonomous UL BWP switching.

In certain embodiments, the remote unit 105 does not clear any configured downlink assignments and configured uplink grants for a serving cell upon considering the associated timeAlignmentTimer as expired in response to detecting consistent UL LBT failure on that serving cell. Furthermore, the UE may not consider all running timeAlignmentTimers as expired, i.e., the remote unit 105 may only the timeAlignmentTimer associated with the serving cell for which consistent LBT failure was detected as expired (other serving cells/timeAlignmentTimers are not impacted).

In certain embodiments, the remote unit 105 suspends any uplink transmissions, e.g., configured grant uplink transmission(s), except the PRACH transmission until the random-access procedure was successfully completed on the (new) UL BWP the remote unit 105 autonomously switched to in response to having detected a consistent UL LBT failure. In certain embodiments, the remote unit 105 upon autonomously switching to another UL BWP configured for a NR-U cell for which consistent LBT failure was detected, does not (re-)initialize any suspended configured uplink grants of configured grant Type 1 on the active BWP according to the stored configuration.

In various embodiments, the base unit 121 configures the remote unit 105 with Configured grant configuration(s) comprising of at least the HARQ process ID(s) the remote unit 105 is to use for uplink transmissions on the corresponding configured uplink resources. In certain embodiments, the set of HARQ process ID(s) configured for the corresponding configured grant allocations is signaled by a bitmap. For cases when two or more ConfiguredGrant configurations have the same HARQ process ID configuration, a bitmap may indicate that the same HARQ process(es) are configured for the two or more CG(s) of a UL BWP, those CG(s) share a common pool of HARQ processes. In one embodiment, the remote unit 105 may transmit retransmissions on different CG resources as compared to initial transmission when CGs share a common pool of HARQ processes.

While FIG. 1 depicts components of a 5G RAN and a 5G core network, the described embodiments for handling consistent UL LBT failure apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN Node" is used for the base station but it is replaceable by any other radio access node, e.g., gNB, eNB, BS, AP, NR, etc. Further the operations are described mainly in the context of 5G NR. However, the proposed solutions/methods are also equally applicable to other mobile communication systems supporting beamforming and/or beams-based cell-sectors.

Figure 2:
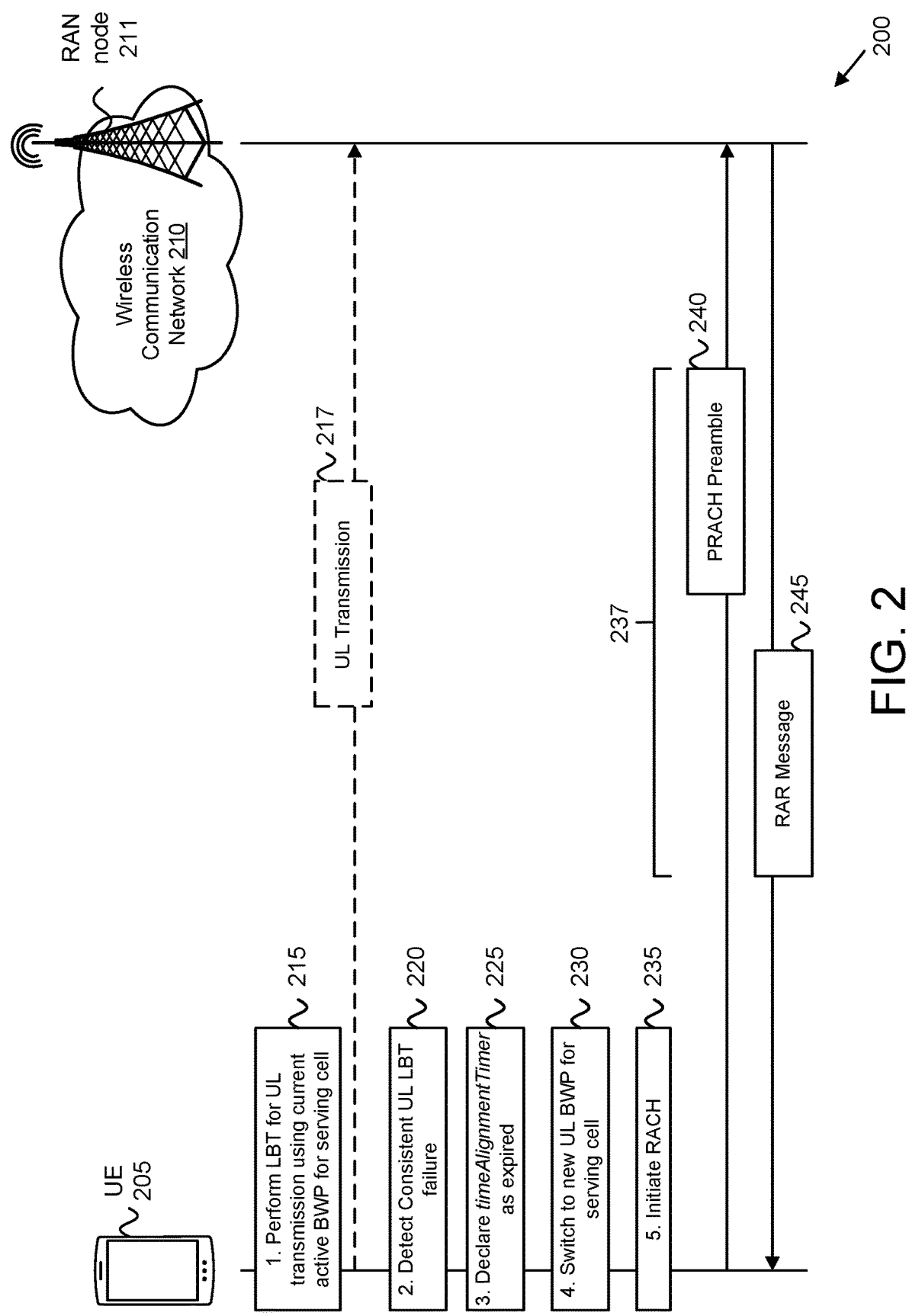
FIG. 2 is a diagram illustrating one embodiment of handling consistent UL LBT failure.

FIG. 2 depicts a procedure 200 for handling consistent UL LBT failure upon consistent LBT failure, according to embodiments of the disclosure. The procedure 200 may be performed by a UE 205, such as the remote unit 105, which is served by a RAN node 211 in a wireless communication network 210. In various embodiments, the UE 205 is one embodiment of the remote unit 105, the RAN node 211 is one embodiment of the base unit 121, where the wireless communication network may be the RAN 120 and/or mobile core network 140. Here, the RAN node 211 communicates with the UE 205 using unlicensed spectrum, e.g., NR-U.

As depicted, the UE 205 performs a Listen-Before-Talk ("LBT") procedure for a UL transmission using a current active BWP for the serving cell (see block 215). If successful, the UE 205 transmits a transport block ("TB") using UL resources (see UL transmission 217). However, if the LBT procedure is unsuccessful (referred to as "LBT failure"), then the UE 205 does not perform UL transmission.

As noted above, the UE 205 may experience consistent UL LBT failure in a current active BWP for the serving cell (see block 220). According to a first solution, the UE 205 considers the timeAlignmentTimer associated with a NR-U cell as expired upon detection/declaring a consistent UL LBT failure in the current active BWP of the NR-U cell (see block 225). As a consequence of considering the uplink timing as non-synchronized for the serving cell, the UE 205 is not allowed to perform any uplink transmissions on that cell except the random-access preamble transmission (i.e., PRACH preamble 240).

According to one implementation of the first solution, the UE 205 further switches to another UL BWP configured for the NR-U cell for which consistent LBT failure was detected (see block 230) and initiates the random-access procedure ("RACH procedure") 237 upon detection of a consistent LBT failure (see block 235). For example, the RACH procedure 237 may include the UE 205 sending a PRACH preamble 240 to the RAN node 211 and the RAN node 211 sending a Random-Access Response ("RAR") message is reply. While FIG. 2 depicts the first two step of a 4-step RACH procedure, it is assumed that the UE 205 and RAN node 211 complete the RACH procedure, e.g., by sending Msg3 (connection request) and Msg4 (contention resolution) message. In other embodiments, the UE 205 and RAN node 211 may perform a two-step RACH procedure or other RACH procedure.

Because the autonomous switching of the UL BWP will implicitly (re-)initialize any suspended configured uplink grants of configured grant Type 1 on the active BWP according to the stored configuration, considering the time-AlignmentTimer as expired ensures that there will be no configured grant uplink transmissions on the UL BWP to which the UE 205 switches (see block 230).

According to one specific implementation of the first solution, the UE 205 does not clear any configured downlink assignments and configured uplink grants for a serving cell upon considering the associated timeAlignmentTimer as expired in response to detecting consistent UL LBT failure on that serving cell (refer to block 225). As used herein, "clearing" a configured DL assignment refers to the UE 205 deleting or marking as invalid the configuration. Similarly, "clearing" as configured UL grant refers to the UE 205 deleting or marking as invalid the configuration. Furthermore, the UE 205 may not consider all running timeAlignmentTimers as expired, i.e., the UE 205 may only the timeAlignmentTimer associated with the serving cell for which consistent LBT failure was detected as expired (other serving cells/timeAlignmentTimers are not impacted).

According to a second solution, the UE 205 (e.g., MAC entity) is to stop any uplink transmission(s) on a serving cell for which consistent UL LBT failure was detected and consider the timeAlignmentTimer associated with this serving cell as expired. The UE 205 may be only allowed to perform the transmission of a Random-access Preamble transmission (i.e., PRACH preamble 235) on the serving cell. According to one implementation of this solution, the serving cell is the SpCell 123, i.e., either a PCell or a PSCell.

According to a third solution, upon autonomously switching to another UL BWP configured for a NR-U cell for which consistent LBT failure was detected, the UE 205 does not (re-)initialize any suspended configured uplink grants of configured grant Type 1 on the active BWP according to the stored configuration. Any unexpected uplink transmissions from the UE 205 except the random-access preamble transmission is to be avoided when UE 205 switches autonomously to another UL BWP. According to one alternative implementation of the third solution, the UE 205 clears any configured downlink assignments and/or configured uplink grants for a serving cell for which consistent LBT failure was detected. As discussed above, clearing the configured downlink assignments and/or configured uplink grants includes deleting and/or marking as invalid the configuration.

According to a fourth solution, the UE 205 suspends any uplink transmissions except the PRACH transmission, e.g., configured grant uplink transmission(s), until the RACH procedure 237 is successfully completed on the (new) UL BWP that the UE 205 autonomously switched to in response to having detected a consistent UL LBT failure.

FIG. 3 depicts a protocol stack 300, according to embodiments of the disclosure. While FIG. 3 shows the UE 205, the RAN node 211 and the mobile core network 140, these are representative of a set of remote units 105 interacting with a base unit 121 and a mobile core network 140. As depicted, the protocol stack 300 comprises a User Plane protocol stack 305 and a Control Plane protocol stack 310. The User Plane protocol stack 305 includes a physical ("PHY") layer 315, a Medium Access Control ("MAC") sublayer 320, a Radio Link Control ("RLC") sublayer 325, a Packet Data Convergence Protocol ("PDCP") sublayer 330, and Service Data Adaptation Protocol ("SDAP") layer 335. The Control Plane protocol stack 310 also includes a physical layer 315, a MAC sublayer 320, a RLC sublayer 325, and a PDCP sublayer 330. The Control Place protocol stack 310 also includes a Radio Resource Control ("RRC") layer and a Non-Access Stratum ("NAS") layer 345.

The AS protocol stack for the Control Plane protocol stack 310 consists of at least RRC, PDCP, RLC and MAC sublayers, and the physical layer. The AS protocol stack for the User Plane protocol stack 305 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 340 and the NAS layer 345 for the control plane and includes, e.g., an Internet Protocol ("IP") layer or PDU Layer (note depicted) for the user plane. L1 and L2 are referred to as "lower layers", while L3 and above (e.g., transport layer, application layer) are referred to as "higher layers" or "upper layers".

The physical layer 315 offers transport channels to the MAC sublayer 320. The MAC sublayer 320 offers logical channels to the RLC sublayer 325. The RLC sublayer 325 offers RLC channels to the PDCP sublayer 330. The PDCP sublayer 330 offers radio bearers to the SDAP sublayer 335 and/or RRC layer 340. The SDAP sublayer 335 offers QoS flows to the mobile core network 140 (e.g., 5GC). The RRC layer 340 provides for the addition, modification, and release of Carrier Aggregation and/or Dual Connectivity. The RRC layer 340 also manages the establishment, configuration, maintenance, and release of Signaling Radio Bearers ("SRBs") and Data Radio Bearers ("DRBs"). In certain embodiments, a RRC entity functions for detection of and recovery from radio link failure.

FIG. 4 depicts an example of Abstract Syntax Notation One (ASN.1) code for a ConfiguredGrant-Config information element ("IE") 400, according to embodiments of the disclosure. The information element 400 may be used to address the second problem, described above. Specifically, the information element 400 includes a new field 'CG-HARQ-Processess-r16'. The field CG-HARQ-Processes indicates which HARQ process IDs are configured for the Configured Grant. Value 0 in the bitmap indicates that the corresponding HARQ process is not allowed for CG transmissions of this configured grant. Value 1 in the bitmap indicates that the corresponding HARQ process ID is configured for the configured grant.

According to a fifth solution, the second problem may be addressed by a network entity like the RAN node 211 configures the UE 205 with Configured grant and/or AUL configuration(s) comprising of at least the HARQ process ID(s) the UE 205 shall use for uplink transmissions on the corresponding configured uplink resources. In one specific implementation the set of HARQ process ID(s) configured for the corresponding configured grant allocations is signaled by means of a bitmap (i.e., the Bit String CG-HARQ-Process-r16 in the IE 400). The length of the bitmap may be equal to the number of parallel UL HARQ processes per HARQ entity (i.e., 16, in the depicted example).

In one embodiment, value '0' in the bitmap indicates that the corresponding HARQ process is not allowed for CG/AUL transmissions, while value '1' in the bitmap indicates that the corresponding HARQ process ID is configured for the configured grant. The UE 205 selects the HARQ process ID for an CG/AUL transmission from the set of configured HARQ process(es)—as signalled by the bitmap—and indicates the used HARQ process ID within the UCI signalled along the PUSCH. In one implementation the ConfiguredGrant-Configuration may be signalled by higher layer signalling, e.g., RRC signalling. The ConfiguredGrant-Configuration may be further comprised of the ConfiguredGrantTimer and ConfiguredGrant-RetransmissionTimer configuration.

According to a sixth solution, the UE 205 may receive two or more ConfiguredGrant configurations per BWP containing the same HARQ process ID configuration, i.e., bitmap indicates that the same HARQ process(es) are configured for the two or more CG(s) of a UL BWP. For such cases when the same HARQ process ID(s) are configured for more than one CG, those CG(s) share a common pool of HARQ processes, i.e., multiple CG(s) are configured with different uplink resources but they share a common pool of HARQ processes as opposed to separate HARQ processes per CG.

According to one implementation of this embodiment, the UE 205 may transmit retransmissions on different CG resources as compared to initial transmission when CGs share a common pool of HARQ processes assuming that those CG(s) use the same TB size ("TBS"). Here, those Configured Grants ("CGs") configured with the same HARQ process IDs may be considered as one big CG configuration being comprised of the union of the uplink resources configured by the individual CGs.

According to a seventh solution, the configuration according to the second embodiment allows the RAN node 211 to control whether CG(s) share a common pool of HARQ processes in order to increase the transmission opportunities, i.e. uplink resources are allocated on different sub-bands, or whether HARQ process(es) are configured separately per CG configuration in order to handle different traffic flows more efficient similar to industrial Internet-of-Things ("I-IoT").

Figure 5:
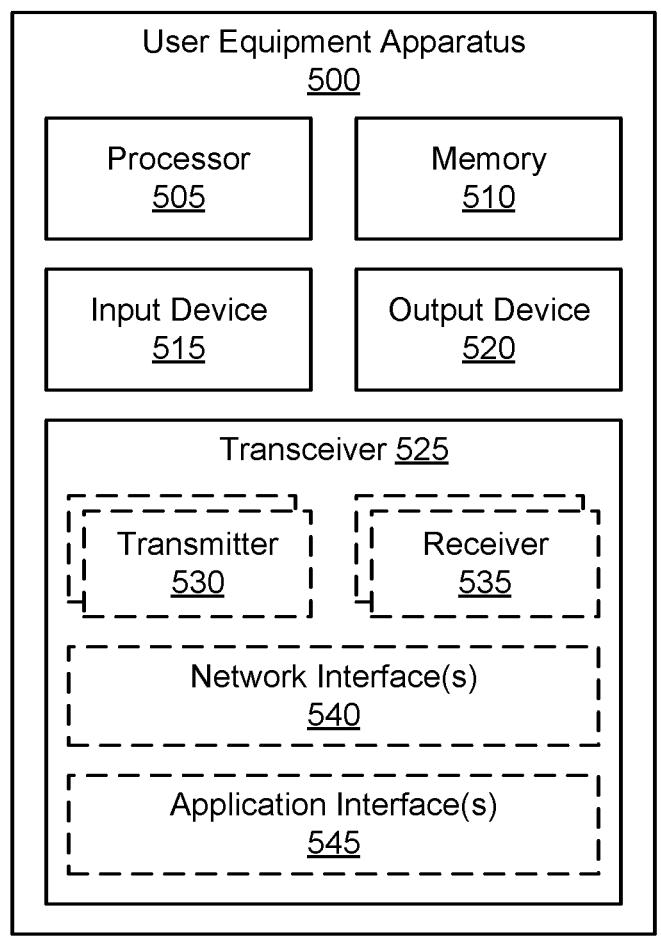
FIG. 5 is a diagram illustrating one embodiment of a user equipment apparatus that may be used for handling consistent UL LBT failure.

FIG. 5 depicts a user equipment apparatus 500 that may be used for handling consistent UL LBT failure, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. Here, the transceiver 525 communicates with one or more serving cells supported by one or more base units 121. Additionally, the transceiver 525 may support at least one network interface 540 and/or application interface 545. The application interface(s) 545 may support one or more APIs. The network interface(s) 540 may support 3GPP reference points, such as Uu and PC5. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. For example, via the transceiver 525, the processor 505 detects an uplink LBT failure in an active BWP of the serving cell. The processor 505 determines a state of consistent uplink LBT failure for the active BWP in response to detecting a predetermined number of uplink LBT failures. The processor 505 sets an unexpired timing alignment timer as expired in response to determining the state of consistent uplink LBT failure for the active BWP and initiates a random-access procedure for the serving cell.

In some embodiments, the processor 505 only allows random-access preamble transmission on the serving cell until the random-access procedure completes successfully, wherein the timing alignment timer is reinitialized in response to successful completion of the random-access procedure. In certain embodiments, the processor 505 stops a pending uplink transmission on the serving cell in response to determining the state of consistent uplink LBT failure for the active BWP. In certain embodiments, the processor suspends a pending uplink transmission on the serving cell until the random-access procedure completes successfully.

In some embodiments, the active BWP is a first uplink BWP configured for the serving cell and the processor 505 switches to a second uplink BWP configured for the serving cell in response to determining a state of consistent uplink LBT failure for the first uplink BWP.

In such embodiments, initiating the random-access procedure includes transmitting a random-access preamble transmission on the second uplink BWP. In certain embodiments, at least one semi-persistent grant (i.e., Configured Grant) is configured for the second uplink BWP, where the processor 505 prevents reinitialization of the at least one semi-persistent grant until the random-access procedure completes successfully. In certain embodiments, preventing reinitialization of the at least one semi-persistent grant includes maintaining configured downlink assignments and/or configured uplink grants for the serving cell.

In some embodiments, setting an unexpired timing alignment timer as expired includes setting only the timing alignment timer corresponding to the serving cell for which consistent LBT failure was detected as expired. In some embodiments, the processor 505 clears configured downlink assignments and/or configured uplink grants for the serving cell in response to determining the state of consistent uplink LBT failure for the active BWP.

In some embodiments, the processor 505 further receives, from a RAN node, a plurality of semi-persistent grant configurations (i.e., Configured Grant configurations) for a BWP of a serving cell, where each configuration indicates a set of at least one HARQ process IDs for the remote unit to use for uplink transmissions on resources corresponding to the semi-persistent grant. In such embodiments, the processor 505 controls the transceiver 525 to transmit data on uplink resources corresponding to a semi-persistent grant and to transmit uplink control information corresponding to the data transmission, where the uplink control information indicates a particular HARQ process ID selected from the set.

In some embodiments, a bitmap is used to indicate the set of HARQ process IDs, the length of the bitmap being equal to a number of parallel uplink HARQ processes per HARQ entity. In certain embodiments, the plurality of semi-persistent grant configurations indicates a common pool of HARQ processes that are shared by a plurality of semi-persistent grants. In such embodiments, the plurality of semi-persistent grant configurations may indicate at least one semi-persistent grant that is configured with one or more HARQ processes that are not a part of the common pool of HARQ processes.

In certain embodiments, transmitting the data comprises sending a data packet (i.e., a TB) on a first uplink resource corresponding to a first semi-persistent grant. In certain embodiments, the processor 505 retransmits the data packet on a second uplink resource corresponding to a second semi-persistent grant, where the first and second semi-persistent grants share a common pool of HARQ processes. In such embodiments, the second uplink resource is allocated on a different frequency sub-band than the first uplink resource.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to handling consistent UL LBT failure. For example, the memory 510 may store configured downlink assignments, uplink configured grants, HARQ processes, HARQ process ID mappings, timing alignment timers, and the like. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
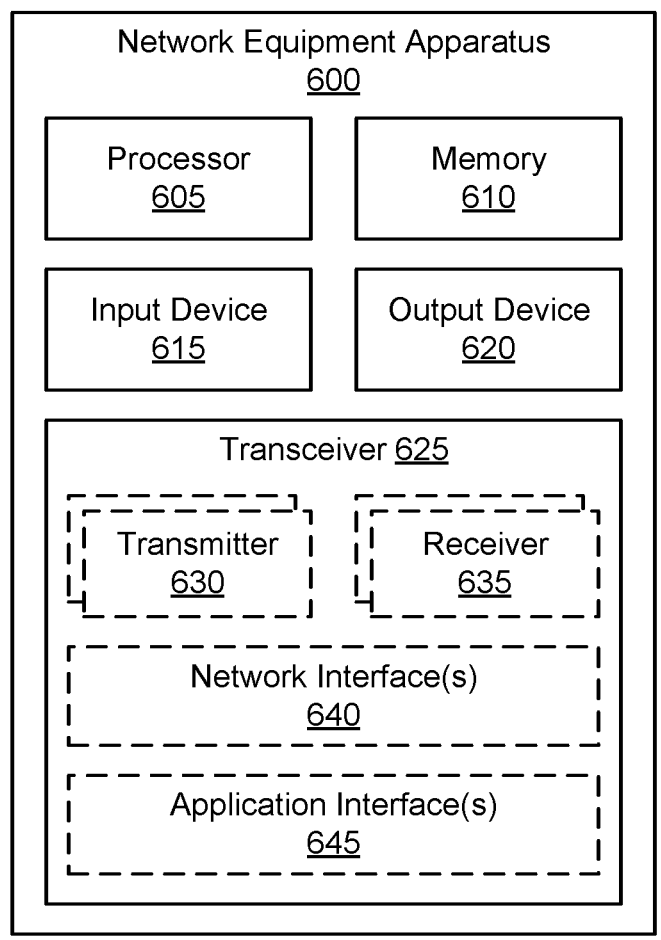
FIG. 6 is a diagram illustrating one embodiment of a network equipment apparatus that may be used for handling consistent UL LBT failure.

FIG. 6 depicts one embodiment of a network equipment apparatus 600 that may be used for handling consistent UL LBT failure, according to embodiments of the disclosure. In some embodiments, the network apparatus 600 may be one embodiment of a RAN node and its supporting hardware, such as the base unit 121, RAN node 211 and/or gNB, described above. Furthermore, network equipment apparatus 600 may include a processor 605, a memory 610, an input device 615, an output device 620, and a transceiver 625. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the network equipment apparatus 600 to implement the above described RAN node behaviors. For example, via the transceiver 625, the processor 605 may support one or more serving cells that serve a UE, including a PCell and/or SCell. In various embodiments, the processor 605 may configure a UE with one or more Configured grant configurations, as described herein.

In some embodiments, the processor 605 configures a remote unit (i.e., a UE) with a plurality of semi-persistent grant configurations (i.e. configured grant configurations)

for a BWP of a serving cell. Here, each configuration may indicate a set of at least one HARQ process IDs for the remote unit to use for uplink transmissions on resources corresponding to the semi-persistent grant. In some embodiments, a bitmap is used to indicate the set of HARQ process IDs, the length of the bitmap being equal to a number of parallel uplink HARQ processes per HARQ entity.

In some embodiments, the plurality of semi-persistent grant configurations indicates a common pool of HARQ processes that are shared by a plurality of semi-persistent grants. In certain embodiments, the plurality of semi-persistent grant configurations indicates at least one semi-persistent grant that is configured with one or more HARQ processes that are not a part of the common pool of HARQ processes.

The transceiver 625 may receive a data transmission on uplink resources corresponding to a semi-persistent grant and receive receiving uplink control information corresponding to the data transmission. Here, the uplink control information indicates a particular HARQ process ID selected from the set. The processor 605 controls the transceiver 625 to transmit HARQ feedback for the data transmission to the remote unit.

In some embodiments, receiving the data transmission comprises receiving a data packet (i.e., TB) on uplink resources corresponding to a first semi-persistent grant. In such embodiments, the transceiver may further receive a retransmission of the data packet on uplink resources corresponding to a second semi-persistent grant, where the first and second semi-persistent grants share a common pool of HARQ processes. In certain embodiments, the uplink resources of the second semi-persistent grant are allocated on a different frequency sub-band than the uplink resources of the first semi-persistent grant.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to handling consistent UL LBT failure, for example storing UE identities, configured downlink assignments, uplink configured grants, HARQ processes, HARQ process ID mappings, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more network functions that provide access to one or more PLMNs. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

Figure 7:
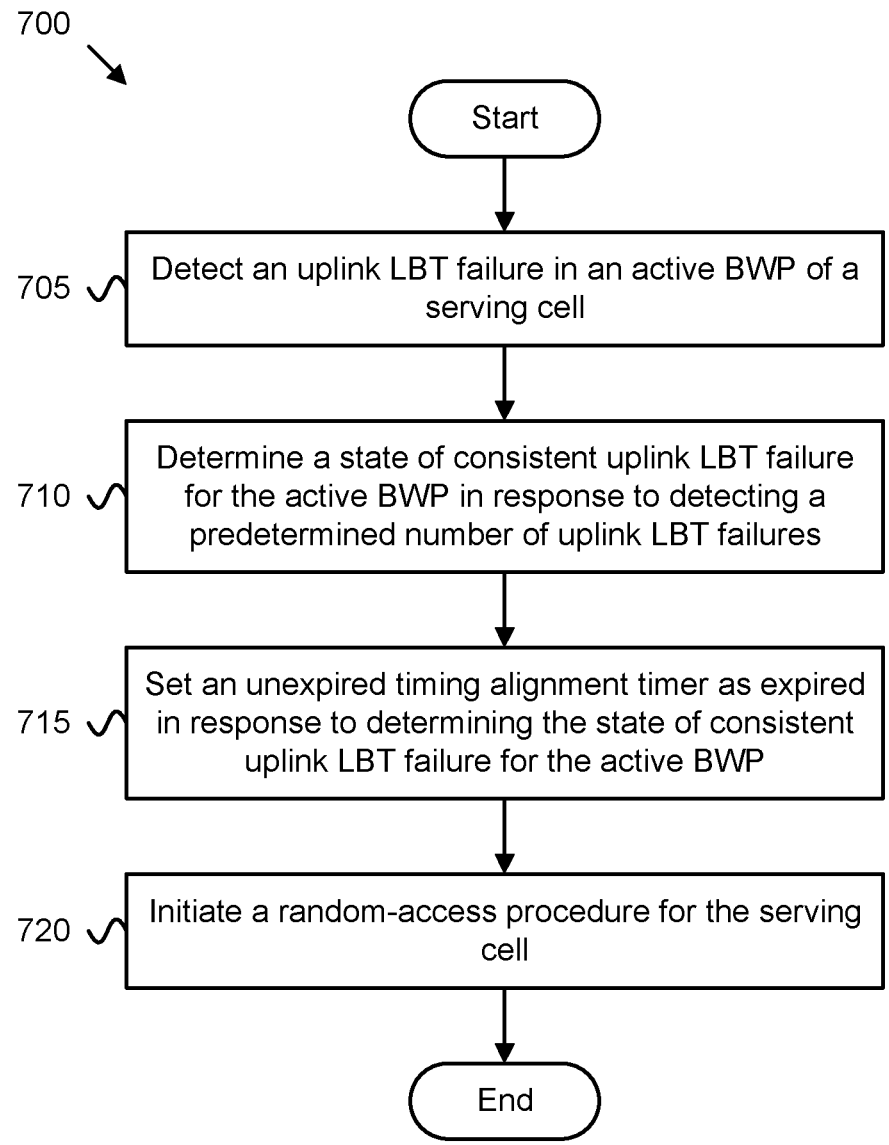
FIG. 7 is a flowchart diagram illustrating one embodiment of a method for handling consistent UL LBT failure.

FIG. 7 depicts one embodiment of a method 700 for handling consistent UL LBT failure, according to embodiments of the disclosure. In various embodiments, the method 700 is performed by a UE, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and detects 705 an uplink LBT failure in an active BWP of a serving cell. The method 700 includes determining 710 a state of consistent uplink LBT failure for the active BWP in response to detecting a predetermined number of uplink LBT failures. The method 700 includes setting 715 an unexpired timing alignment timer as expired in response to determining the state of consistent uplink LBT failure for the active BWP. The method 700 includes initiating 720 a random-access procedure for the serving cell. The method 700 ends.

Disclosed herein is a first apparatus for handling consistent UL LBT failure, according to embodiments of the disclosure. The first apparatus may be implemented by a UE, such as the remote unit 105, the UE 205 and/or the user equipment apparatus 500, described above. The first apparatus includes a transceiver that communicates with a serving cell in a wireless communication network. The first apparatus includes a processor that detects an uplink LBT failure in an active BWP of the serving cell and determines a state of consistent uplink LBT failure for the active BWP in response to detecting a predetermined number of uplink LBT failures. The processor sets an unexpired timing alignment timer as expired in response to determining the state of consistent uplink LBT failure for the active BWP and initiates a random-access procedure for the serving cell.

In some embodiments, the processor only allows random-access preamble transmission on the serving cell until the random-access procedure completes successfully, wherein the timing alignment timer is reinitialized in response to successful completion of the random-access procedure. In certain embodiments, the processor stops a pending uplink transmission on the serving cell in response to determining the state of consistent uplink LBT failure for the active BWP. In certain embodiments, the processor suspends a pending uplink transmission on the serving cell until the random-access procedure completes successfully.

In some embodiments, the active BWP is a first uplink BWP configured for the serving cell and the processor switches to a second uplink BWP configured for the serving cell in response to determining a state of consistent uplink LBT failure for the first uplink BWP. In such embodiments, initiating the random-access procedure includes transmitting a random-access preamble transmission on the second uplink BWP. In certain embodiments, at least one semi-persistent grant (i.e., Configured Grant) is configured for the second uplink BWP, where the processor prevents reinitialization of the at least one semi-persistent grant until the random-access procedure completes successfully. In certain embodiments, preventing reinitialization of the at least one semi-persistent grant includes maintaining configured downlink assignments and/or configured uplink grants for the serving cell.

In some embodiments, setting an unexpired timing alignment timer as expired includes setting only the timing alignment timer corresponding to the serving cell for which consistent LBT failure was detected as expired. In some embodiments, the processor clears configured downlink assignments and/or configured uplink grants for the serving cell in response to determining the state of consistent uplink LBT failure for the active BWP.

In some embodiments, the processor further receives, from a RAN node, a plurality of semi-persistent grant configurations (i.e., Configured Grant configurations) for a BWP of a serving cell, where each configuration indicates a set of at least one HARQ process IDs for the remote unit to use for uplink transmissions on resources corresponding to the semi-persistent grant. In such embodiments, the processor controls the transceiver to transmit data on uplink resources corresponding to a semi-persistent grant and to transmit uplink control information corresponding to the data transmission, where the uplink control information indicates a particular HARQ process ID selected from the set.

In some embodiments, a bitmap is used to indicate the set of HARQ process IDs, the length of the bitmap being equal to a number of parallel uplink HARQ processes per HARQ entity. In certain embodiments, the plurality of semi-persistent grant configurations indicates a common pool of HARQ processes that are shared by a plurality of semi-persistent grants. In such embodiments, the plurality of semi-persistent grant configurations may indicate at least one semi-persistent grant that is configured with one or more HARQ processes that are not a part of the common pool of HARQ processes.

In certain embodiments, transmitting the data comprises sending a data packet (i.e., a TB) on a first uplink resource corresponding to a first semi-persistent grant. In certain embodiments, the processor retransmits the data packet on a second uplink resource corresponding to a second semi-persistent grant, where the first and second semi-persistent grants share a common pool of HARQ processes. In such embodiments, the second uplink resource is allocated on a different frequency sub-band than the first uplink resource.

Disclosed herein is a first method for handling consistent UL LBT failure, according to embodiments of the disclosure. The first method may be performed by a UE, such as the remote unit 105, the UE 205 and/or the user equipment apparatus 500, described above. The first method includes detecting an uplink LBT failure in an active BWP of a serving cell and determining a state of consistent uplink LBT failure for the active BWP in response to detecting a predetermined number of uplink LBT failures. The first method includes setting an unexpired timing alignment timer as expired in response to determining the state of consistent uplink LBT failure for the active BWP and initiating a random-access procedure for the serving cell.

In some embodiments, the first method includes only allowing random-access preamble transmission on the serving cell until the random-access procedure completes successfully, wherein the timing alignment timer is reinitialized in response to successful completion of the random-access procedure. In certain embodiments, the first method includes stopping a pending uplink transmission on the serving cell in response to determining the state of consistent uplink LBT failure for the active BWP. In certain embodiments, the first method includes suspending a pending uplink transmission on the serving cell until the random-access procedure completes successfully.

In some embodiments, the active BWP is a first uplink BWP configured for the serving cell, the method further comprising switching to a second uplink BWP configured for the serving cell in response to determining a state of consistent uplink LBT failure for the first uplink BWP. In such embodiments, initiating the random-access procedure comprises transmitting a random-access preamble transmission on the second uplink BWP. In certain embodiments, at least one semi-persistent grant (i.e., Configured Grant) is configured for the second uplink BWP, the method further comprising preventing reinitialization of the at least one semi-persistent grant until the random-access procedure completes successfully. In certain embodiments, preventing reinitialization of the at least one semi-persistent grant comprises maintaining configured downlink assignments and/or configured uplink grants for the serving cell.

In some embodiments, setting an unexpired timing alignment timer as expired comprises setting only the timing alignment timer corresponding to the serving cell for which consistent LBT failure was detected as expired. In some embodiments, the first method includes clearing configured downlink assignments and/or configured uplink grants for the serving cell in response to determining the state of consistent uplink LBT failure for the active BWP.

In some embodiments, the first method includes receiving, from a RAN node, a plurality of semi-persistent grant configurations (i.e. Configured Grant configurations) for a BWP of a serving cell, where each configuration indicates a set of at least one HARQ process IDs for the remote unit to use for uplink transmissions on resources corresponding to the semi-persistent grant. In such embodiments, the first method also includes transmitting data on uplink resources corresponding to a semi-persistent grant and transmitting uplink control information corresponding to the data transmission, where the uplink control information indicates a particular HARQ process ID selected from the set.

In some embodiments, a bitmap is used to indicate the set of HARQ process IDs, the length of the bitmap being equal to a number of parallel uplink HARQ processes per HARQ entity. In certain embodiments, the plurality of semi-persistent grant configurations indicates a common pool of HARQ processes that are shared by a plurality of semi-persistent grants. In such embodiments, the plurality of semi-persistent grant configurations indicates at least one semi-persistent grant that is configured with one or more HARQ processes that are not a part of the common pool of HARQ processes.

In certain embodiments, transmitting the data comprises sending a data packet (i.e., TB) on a first uplink resource corresponding to a first semi-persistent grant. In certain embodiments, the method further includes retransmitting the data packet on a second uplink resource corresponding to a second semi-persistent grant, where the first and second semi-persistent grants share a common pool of HARQ processes. In such embodiments, the second uplink resource is allocated on a different frequency sub-band than the first uplink resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   detecting an Listen-Before-Talk ("LBT") failure in an active bandwidth part ("BWP") of a serving cell;
   detecting a number of LBT failures for the active BWP;
   setting a timing alignment timer as expired in response to one or more of the detected LBT failure for the active BWP and the detected number of LBT failures for the active BWP;
   initiating a random-access procedure for the serving cell, wherein initiating the random-access procedure comprises transmitting a random-access preamble; and
   reinitializing the timing alignment timer in response to receiving a random-access response.

2. The method of claim 1, further comprising only allowing random-access preamble transmission on the serving cell until the random-access procedure completes successfully.

3. The method of claim 2, further comprising:
   determining a state of consistent uplink LBT failure for the active BWP based on the number of LBT failures; and
   stopping a pending uplink transmission on the serving cell in response to the state of consistent uplink LBT failure.

4. The method of claim 2, further comprising suspending a pending uplink transmission on the serving cell until the random-access procedure completes successfully.

5. The method of claim 1, wherein the active BWP is a first uplink BWP configured for the serving cell, the method further comprising switching to a second uplink BWP configured for the serving cell in response to determining a state of consistent uplink LBT failure for the first uplink BWP based on the number of LBT failures, wherein initiating the random-access procedure comprises transmitting the random-access preamble on the second uplink BWP.

6. The method of claim 5, wherein at least one semi-persistent grant is configured for the second uplink BWP, the method further comprising preventing reinitialization of the at least one semi-persistent grant until the random-access procedure completes successfully.

7. The method of claim 6, wherein preventing reinitialization of the at least one semi-persistent grant comprises maintaining configured downlink assignments and/or configured uplink grants for the serving cell.

8. The method of claim 1, wherein setting the alignment timer as expired comprises setting only the timing alignment timer corresponding to the serving cell for which the number of LBT failures were detected as expired.

9. The method of claim 1, further comprising clearing configured downlink assignments and/or configured uplink grants for the serving cell in response to one or more of the detected LBT failure for the active BWP and the detected number of LBT failures for the active BWP.

10. The method of claim 1, further comprising:
    receiving, from a RAN node, a plurality of semi-persistent grant configurations for a bandwidth part ("BWP") of a serving cell,
    wherein each configuration indicates a set of at least one HARQ process IDs for the UE to use for uplink transmissions on resources corresponding to the semi-persistent grant;
    transmitting data on uplink resources corresponding to a semi-persistent grant; and
    transmitting uplink control information corresponding to the data, wherein the uplink control information indicates a particular HARQ process ID selected from the set of the at least one HARQ process IDs.

11. The method of claim 10, wherein a bitmap is used to indicate the set of HARQ process IDs, a length of the bitmap being equal to a number of parallel uplink HARQ processes per HARQ entity.

12. The method of claim 10, wherein the plurality of semi-persistent grant configurations indicates a common pool of HARQ processes that are shared by a plurality of semi-persistent grants.

13. The method of claim 12, wherein plurality of semi-persistent grant configurations indicates at least one semi-persistent grant that is configured with one or more HARQ processes that are not a part of the common pool of HARQ processes.

14. The method of claim 10, wherein transmitting the data comprises sending a data packet on a first uplink resource corresponding to a first semi-persistent grant, the method further comprising retransmitting the data packet on a second uplink resource corresponding to a second semi-persistent grant, wherein the first and second semi-persistent grants share a common pool of HARQ processes.

15. The method of claim 14, wherein the second uplink resource is allocated on a different frequency sub-band than the first uplink resource.

16. A user equipment (UE), comprising:
    at least one memory; and
    at least one processor coupled with the at least one memory and configured to cause the UE to:
    detect an Listen-Before-Talk ("LBT") failure in an active bandwidth part ("BWP") of a serving cell;
    detect a number of LBT failures for the active BWP;

set a timing alignment timer as expired in response to one or more of the detected LBT failure for the active BWP and the detected number of LBT failures for the active BWP;

transmit a random-access preamble to initiate a random-access procedure for the serving cell; and reinitialize the timing alignment timer in response to receiving a random-access response.

17. The UE of claim 16, wherein the at least one processor is configured to cause the UE to only allow random-access preamble transmission on the serving cell until the random-access procedure completes successfully.

18. The UE of claim 17, wherein the at least one processor is configured to cause the UE to:

determine a state of consistent uplink LBT failure for the active BWP based on the number of LBT failures; and stop a pending uplink transmission on the serving cell in response to the state of consistent uplink LBT failure.

19. The UE of claim 17, wherein the at least one processor is configured to cause the UE to suspend a pending uplink transmission on the serving cell until the random-access procedure completes successfully.

20. The UE of claim 16, wherein the active BWP is a first uplink BWP configured for the serving cell, wherein the at least one processor is configured to cause the UE to switch to a second uplink BWP configured for the serving cell in response to determining a state of consistent uplink LBT failure for the first uplink BWP based on the number of LBT failures, wherein to initiate the random-access procedure, the at least one processor is configured to cause the UE to transmit the random-access preamble on the second uplink BWP.

* * * * *